United States Patent
Shoraku et al.

(10) Patent No.: US 8,259,279 B2
(45) Date of Patent: Sep. 4, 2012

(54) LIQUID CRYSTAL DISPLAY PANEL, LIQUID CRYSTAL DISPLAY DEVICE, AND TELEVISION RECEIVER

(75) Inventors: Akihiro Shoraku, Osaka (JP); Naoshi Yamada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 414 days.

(21) Appl. No.: 12/528,385
(22) PCT Filed: Nov. 1, 2007
(86) PCT No.: PCT/JP2007/071306
§ 371 (c)(1), (2), (4) Date: Aug. 24, 2009
(87) PCT Pub. No.: WO2008/108031
PCT Pub. Date: Sep. 12, 2008

(65) Prior Publication Data
US 2010/0097553 A1    Apr. 22, 2010

(30) Foreign Application Priority Data

Mar. 7, 2007 (JP) ................. 2007-057171

(51) Int. Cl.
*G02F 1/1339* (2006.01)
(52) U.S. Cl. ........................................................ 349/156
(58) Field of Classification Search .................. 349/156
See application file for complete search history.

(56) References Cited

U.S. PATENT DOCUMENTS

| | | | |
|---|---|---|---|
| 7,423,717 B2 * | 9/2008 | Kadotani | 349/155 |
| 7,679,712 B2 * | 3/2010 | Song et al. | 349/156 |
| 7,684,002 B2 * | 3/2010 | Lee et al. | 349/156 |
| 2005/0237470 A1 | 10/2005 | Kadotani | |
| 2006/0146222 A1 | 7/2006 | Kim et al. | |
| 2007/0132937 A1 * | 6/2007 | Lee et al. | 349/156 |
| 2007/0268438 A1 | 11/2007 | Nakamura et al. | |

FOREIGN PATENT DOCUMENTS

| | | |
|---|---|---|
| CN | 1690790 A | 11/2005 |
| JP | 11-248921 | 9/1999 |
| JP | 2001-100221 | 4/2001 |
| JP | 2005-338770 | 12/2005 |
| JP | 2006-38951 | 2/2006 |
| WO | WO 2006/022259 | 3/2006 |

OTHER PUBLICATIONS

Chinese Office Action and English translation thereof mailed May 12, 2010 in corresponding CN Application 200780050116.4.
International Search Report for PCT/JP2007/071306, mailed Jan. 22, 2008.

* cited by examiner

*Primary Examiner* — James Dudek
(74) *Attorney, Agent, or Firm* — Nixon & Vanderhye P.C.

(57) ABSTRACT

The present invention provides a liquid crystal display panel, a liquid crystal display device, and a television receiver, each of which permits shortening of production time, simplification of inventory management of the CF substrate, and reduction in production costs. The present invention is a liquid crystal display panel including:
 a first substrate;
 a second substrate; and
 a liquid crystal layer interposed between the first and second substrates,
 the first substrate including a first insulating substrate, a first wiring, and a flattening layer,
 the first wiring being formed on a liquid crystal layer side of the first insulating substrate,
 the flattening layer being arranged between the liquid crystal layer and the first wiring,
 the second substrate including a second insulating substrate and a column spacer,
 the column spacer being arranged on a liquid crystal layer side of the second insulating substrate to face a region where the first wiring overlaps with the flattening layer,
 wherein the first substrate includes a height adjustment layer,
 the height adjustment layer being arranged to face the column spacer.

2 Claims, 9 Drawing Sheets

LIQUID CRYSTAL DISPLAY PANEL, LIQUID CRYSTAL DISPLAY DEVICE, AND TELEVISION RECEIVER

This application is the U.S. national phase of International Application No. PCT/JP2007/071306, filed 1 Nov. 2007, which designated the U.S. and claims priority to Japan Application No. 2007-057171 filed 7 Mar. 2007, the entire contents of each of which are hereby incorporated by reference.

TECHNICAL FIELD

The present invention relates to a liquid crystal display panel, a liquid crystal display device, and a television receiver. More particularly, the present invention relates to a liquid crystal display panel, a liquid crystal display device, and a television receiver, each including a column spacer.

BACKGROUND ART

A liquid crystal display device is a kind of display device and includes a liquid crystal display panel including a pair of substrates (e.g., an active matrix substrate and a counter substrate) facing each other with a liquid crystal layer therebetween. Such a liquid crystal display device is being used in various applications, and its performances are being more and more improved. Particularly, display modes (liquid crystal modes) that permit wide viewing angle characteristics such as MVA (multi domain vertical alignment) mode have been developed, and a liquid crystal display device in such display modes is being further improved.

In order to improve display qualities of the liquid crystal display device, it is necessary to control the thickness of a liquid crystal layer (hereinafter, also referred to as a "cell gap") precisely regardless of the display mode. Particularly in a large-sized liquid crystal display device that becoming more and more used now, the cell gap needs to be controlled to be uniform over a very large region.

The cell gap is controlled by a spacer that is arranged between the pair of substrates. A fiver or particle spacer (for example, plastic beads) has been used as a common spacer, and such a spacer is arranged by being sprayed on the substrate. However in such a case where spacers such as plastic beads are sprayed, the position where the spacers are arranged can not be controlled, and so liquid crystal molecules in a pixel (pixel opening) might not be aligned in proper directions. In a pixel where the liquid crystal molecules are not aligned in proper direction, variation is observed. In addition, if such a spacer is used, a base layer that is formed on the substrate has irregular surface, and thereby the cell gap varies. This variation in cell gap causes uneven display.

A method in which a column spacer is formed on a substrate by photolithography using a photosensitive material are now being used. Such a spacer is also referred to as a column spacer (photo spacer).

FIGS. 11 and 13 are cross-sectional views of conventional liquid crystal display panels and each schematically show a configuration around a region where a column spacer is arranged. As shown in FIG. 11, a method in which a resist for spacers is formed to give a column spacer 117a separately from other layers is commonly used for forming the column spacer. In addition, as shown in FIG. 13, a column spacer 117b composed of stacked color filters (colored layers) and the like (hereinafter, also referred to as a "multi-layer spacer") is also used (for example, such a spacer is disclosed in Patent Documents 1 to 3).

High-frequency driving is now being researched and developed for improvement in moving image display and for higher definition. However, conventional liquid crystal display devices can not be driven at high-frequency because a parasitic capacitance, which is generated in a liquid crystal panel, deforms a signal waveform.

For this problem, in order to decrease a capacitance that is formed at an intersection between a scanning wiring and a signal wiring, a spin-on glass (hereinafter, also referred to as a "SOG") material is arranged between the scanning wiring and the signal wiring (for example, refer to Patent Document 4).

[Patent Document 1]
Japanese Kokai Publication No. 2001-100221
[Patent Document 2]
Japanese Kokai Publication No. Hei-11-248921
[Patent Document 3]
Japanese Kokai Publication No. 2006-38951
[Patent Document 4]
WO 2006/022259

DISCLOSURE OF INVENTION

A film made of the SOG material has a flattening function because it is generally formed by spin coating. So the film in a part overlapping with a wiring has a thickness smaller than that of the film in a part not overlapping with the wiring.

So if a column spacer is arranged to face a wiring, it is necessary to arrange column spacers with different heights in order to uniform the thickness of the liquid crystal layer (cell gap) between the case that the SOG material is used and the case that it is not used. The reason for this is mentioned in more detail with reference to FIGS. 11 to 14. FIGS. 11 and 12 are cross-sectional views of conventional liquid crystal display panels and each schematically show a configuration around a region where a column spacer is arranged. FIGS. 13 and 14 are cross-sectional views of conventional liquid crystal display panels and each schematically show a configuration around a region where a column spacer (multi-layer spacer) is arranged. An alignment film is not shown in FIGS. 11 to 14.

Comparison between the configuration in FIG. 11 and that in FIG. 12 is mentioned below. A conventional liquid crystal display panel 200a shown in FIG. 11 is mentioned first. A column spacer 117a is arranged in a color filter substrate (hereinafter, also referred to as a "CF substrate") to face a gate line 132. The CF substrate 110a further includes a black matrix (BM) layer 112, a color filter 113, and a counter electrode 116 on an insulating substrate 111. An active matrix substrate (hereinafter, also referred to as a "TFT substrate") 130a includes, on an insulating substrate 131: a gate line 132; a pixel electrode 142; and a gate insulating film (GI) 135 and a passivation film (Pas) 141, each formed between the gate line 132 and the pixel electrode 142. A liquid crystal layer 120 is interposed between the CF substrate 110a and the TFT substrate 130a. In the liquid crystal display panel 200a, a cell gap d1 in a pixel opening is adjusted so that proper optical characteristics are exhibited. An optimum value of the cell gap d1 depends on a liquid crystal material to be used, display mode, and the like. A height hs1 of the column spacer 117 is determined so that the cell gap d1 is adjusted to a desired value.

A conventional liquid crystal display panel 200b shown in FIG. 12 is mentioned below. A TFT substrate 130b further includes a SOG film 147 between the GI 135 and the gate line 132, in addition to the configuration mentioned in the TFT substrate 130a in the liquid crystal display panel 200a. Also in the liquid crystal display panel 200b, a cell gap d2 in a pixel opening needs to be adjusted so that proper optical characteristics are exhibited, similarly to the cell gap d1 in the liquid crystal display panel 100.

A surface-level difference between the part where the pixel electrode 142 is arranged and the part facing the column spacer 117a is different between the liquid crystal display panels 200a and 200b. That is, a surface-level difference x1 in the liquid crystal display panel 200a is different from a surface-level difference y2 in the liquid crystal display panel 200b. The reason for this difference between the liquid crystal display panels 200a and 200b is mentioned below. In the liquid crystal display panel 200b, a film made of a SOG material (the SOG film 147) as well as the gate insulating film 135 and the Pas film 141 are arranged between the gate line 132 and the pixel electrode 142. If the thickness in a region overlapping with the pixel electrode 142 of the SOG film 147 is defined as ds1 and the thickness in the region overlapping with the gate line 132 of the SOG film 147 is defined as ds2, a relationship of ds1>ds2 is satisfied because of the SOG material has a flattening function. That is, the SOG film functions as a flattening layer. Thus, the surface-level difference x1 in the liquid crystal display panel 200a is different from the surface-level difference y2 in the liquid crystal display panel 200b. Accordingly, in order to set the cell gaps d1 and d2 in the liquid crystal display panels 200a and 200b to desired values, respectively, a height hs1 of the column spacer in the panel not including the SOG film 197 and a height hs2 of the column spacer in the panel including the SOG film 147 need to be separately adjusted to proper values.

Although the SOG material has a flattening function, the surface-level difference between the wiring part, e.g., a region where the gate line 132 is arranged, and other regions is not completely eliminated in some cases. FIGS. 12 and 14 each show a case that the SOG material does not perfectly flatten the TFT substrate surface. The gate insulating film 135 (for example, a SiNx film) and the Pas film 191 (for example, a SiNx film) are generally formed by CVD (chemical vapor deposition). In such a case, these films have no flattening function. Each film generally has uniform thickness and there is no difference in thickness between a region where a wiring is arranged and other regions.

The SOG film 147 is needed for a reduction in parasitic capacitance, but production costs of the liquid crystal panel including such a SOG film increase. So a liquid crystal display device that does not need to be operated by high-speed driving may have a conventional structure not including the SOG film 147. In this case, depending on whether the TFT substrate includes the SOG film 147 or not, two kinds of CF substrates different in height of the column spacer needs to be produced even when liquid crystal display panels in the same screen size and resolution are produced. In such a case, different two conditions for forming the column spacer are needed, which leads to lost production time, and further inventory management of the CF substrate becomes complicated. In such a point, there is room for improvement.

The same problem arises also in the case that the column spacer is a multi-layer spacer. As shown in liquid crystal display panels 200c not including the SOG film 147 and 200d including the SOG film 147 in FIGS. 13 and 14, a height hs3 of a column spacer 117b and a height hs4 of a column spacer 117b need to be adjusted to different values. In the liquid crystal display panels 200c and 200d, a CF substrate 110b includes the column spacer (multi-layer spacer) 117b. The column spacer 117b is often formed by stacking a black matrix (BM) layer 112, color filters of respective colors (a red color filter 114R, a green color filter 114G, a blue color filter 114B), a resin layer 118 for forming a alignment control projection in MVA mode device, and the like, as shown in FIGS. 13 and 14. Each of the BM layer 112, the color filters 114R, 119G, and 114B of the respective colors, and the resin layer 118 generally needs to have their own proper thicknesses. Compared to the column spacers 117a shown in FIGS. 11 and 12, the height of the column spacer 117b is very difficult to adjust. For example, the alignment control projection controls an alignment direction of liquid crystals when a voltage is applied to the panel. The height of the alignment control projection is closely related to characteristics such as response speed, and so the thickness of the resin layer 118 is adjusted so that proper characteristics such as response speed are exhibited. The BM layer 112 needs to have a specific light-shielding property. Further, the thickness of the color filter layers 114R, 114G, and 114B is determined in view of a desired color or transmittance. Accordingly, in the liquid crystal display panels 200c and 200d, it is difficult to set the cell gaps d3 and d4 to desired values, respectively. In addition, in order to reduce loss (time loss or increase in costs) that is generated because liquid crystal materials are switched in a step of forming the liquid crystal layer 120, the same liquid crystal material is generally used when the liquid crystal display panels 200a and 200b are produced and when the liquid crystal display panels 200c and 200d are produced. In this case, proper cell gaps d1 and d2 in the liquid crystal display panels 200a and 200b need to be the same, and proper cell gaps d3 and d4 in the liquid crystal display panels 200c and 200d also need to be the same (d1=d2, d3=d4). As mentioned above, different conditions are employed for forming the respective spacers 117a and 117b in the panels 200a to 200d, which results in loss of production (time loss or increase in cost). Particularly, adjustment itself of the height of the column spacer 117b is difficult.

The present invention has been made in view of the above-mentioned state of the art. The present invention has an object to provide a liquid crystal display panel, a liquid crystal display device, and a television receiver, each of which permits shortening of production time, simplification of inventory management of the CF substrate, and reduction in production costs.

The present inventors made various investigations on a liquid crystal display panel, a liquid crystal display device, and a television receiver, each of which permits shortening of production time, simplification of inventory management of the CF substrate, and reduction in production costs. The present inventors noted a region facing a column spacer in a substrate including a flattening layer. The inventors found the followings. The same CF substrate can be used in a liquid crystal display panel including a flattening layer such as the SOG film 147 and a liquid crystal display panel not including it if a height adjustment layer is arranged to face a column spacer in a substrate including a wiring such as a gate line and a flattening layer arranged above the wiring. In such a manner, time loss that is generated because the conditions for forming the column spacer are switched, complication of inventory management of CF substrate, and the like, can be reduced and an increase in production costs can be suppressed. Thus, the above-mentioned problems have been admirably solved, leading to completion of the present invention.

That is, the present invention is a liquid crystal display panel including: a first substrate; a second substrate; and a liquid crystal layer interposed between the first and second substrates, the first substrate including a first insulating substrate, a first wiring, and a flattening layer, the first wiring being formed on a liquid crystal layer side of the first insulating substrate, the flattening layer being arranged between the liquid crystal layer and the first wiring, the second substrate including a second insulating substrate and a column spacer, the column spacer being arranged on a liquid crystal layer side of the second insulating substrate to face a region where the first wiring overlaps with the flattening layer, wherein the first substrate includes a height adjustment layer, the height adjustment layer being arranged to face the column spacer. According to this, a CF substrate that is used in a conventional liquid crystal display panel including no flattening layer can be used in the liquid crystal display panel of the present invention. So conditions for forming the column spacer do not need to be switched and further, complication of inventory management of the CF substrate is reduced. As a result, shortening of production time of the liquid crystal display panel of the present invention, simplification of inventory management of the CF substrate, and reduction in production costs are permitted.

The above-mentioned height adjustment layer may be composed of a single layer or a plurality of layers. The above-mentioned height adjustment layer may have a structure composed of a plurality of layers that are continuously stacked or may have a structure composed of a plurality of layers that are stacked with a layer different from the height adjustment layer therebetween. The above-mentioned height adjustment layer may or may not be in contact with the column spacer. The above-mentioned height adjustment layer may be arranged between the flattening layer and the first insulating substrate, or between the flattening layer and the liquid crystal layer.

The above-mentioned height adjustment layer is not generally arranged in a pixel opening. That is, the above-mentioned height adjustment layer is generally arranged in a region overlapping with the first wiring, and also arranged in a light-shielding region. Thus, it is preferable that the above-mentioned height adjustment layer is formed into an island shape. It is more preferable that the height adjustment layer is formed into an island shape in a region overlapping with the first wiring and that the height adjustment layer is formed into an island shape in a region overlapping with a light-shielding region. The pixel opening is an opening in a pixel (a region that transmits light). The light-shielding region is a region where light is shielded by a light-shielding member). A scanning signal line (gate line) and a black matrix (BM) layer are preferable as the light-shielding member.

The above-mentioned flattening layer is a layer having a flattening function, i.e., a layer that reduces a surface-level difference. The above-mentioned flattening layer is generally formed to cover at least a display region.

The configuration of the liquid crystal display panel is not especially limited. The panel may or may not include other components as long as it essentially includes these components. The above-mentioned first substrate generally includes a gate insulating film, the second wiring, a switching element, and a pixel electrode.

The first substrate includes: the first insulating substrate; the first wiring formed on the liquid crystal layer side of the first insulating substrate; the gate insulating film covering the first wiring; the second wiring crossing with the first wiring, with at least the gate insulating film therebetween; the switching element operating in accordance with a voltage applied to the first wiring; the pixel electrode electrically connected to the second wiring with the switching element therebetween; and the flattening layer arranged between the liquid crystal layer and the first wiring and between the insulating substrate and the pixel electrode.

The first wiring may be a data signal line (source line, data wiring). The second wiring may be a scanning signal line (gate line, gate wiring). As mentioned above, the scanning signal line is preferable as the first wiring, and the data signal line is preferable as the second wiring. The above-mentioned first wiring may be a storage capacitor wiring.

Preferable embodiments of the liquid crystal display panel of the present invention are mentioned below in detail. Various embodiments mentioned below may be appropriately combined.

It is preferable that the height adjustment layer includes a layer made of the same material as a material for a member that is arranged in the first substrate other than the first wiring and the flattening layer. According to this, the height adjustment layer can be easily formed without complicating the processes for producing the liquid crystal display device.

In the present description, the "layer made of the same material as a material for a member that is arranged in the first substrate" means that the layer is provided with a composition equivalent to that of the member by producing the layer and the member in the same process. However, a difference in the composition between the layer and the member, which might be generated even if the layer and the member are formed in the same process, is acceptable.

Preferable embodiments of the above-mentioned height adjustment layer are specifically mentioned below. According to such embodiments, the height adjustment layer can be easily formed without complicating the processes for producing the liquid crystal display panel.

That is, it is preferable that the first substrate includes a switching element, the switching element includes a semiconductor active layer, and the height adjustment layer includes a layer made of the same material as a material for the semiconductor active layer. According to this embodiment, it is preferable that the switching element generally includes an impurity-added semiconductor layer in addition to the semiconductor active layer.

It is also preferable that the first substrate includes a switching element, the switching element includes a semiconductor active layer and an impurity-added semiconductor layer, and the height adjustment layer includes: a layer including the semiconductor active layer; and a layer including the impurity-added semiconductor layer.

It is preferable that the first substrate includes a pixel electrode, and the height adjustment layer includes a layer made of the same material as a material for the pixel electrode.

It is preferable that the first substrate includes a second wiring, and the height adjustment layer includes a layer made of the same material as a material for the second wiring.

The above-mentioned specific embodiments of the height adjustment layer may be appropriately combined in order to adjust the thickness of the height adjustment layer to a desired value.

It is preferable that the height adjustment layer is electrically isolated. According to this, parasitic capacitances between the height adjustment layer and a wiring, between the height adjustment layer and an electrode, and the like, can be reduced, and further generation of short-circuit between the height adjustment layer and a wiring, between the height adjustment layer and an electrode, and the like, also can be suppressed.

It is preferable that the flattening layer functions as an interlayer insulating film. According to this, the first wiring can be effectively insulated from the wiring, electrode, and the like, arranged with the flattening layer therebetween. Further, a parasitic capacitance formed between them can be reduced.

Thus, in the present description, the interlayer insulating film is a film having a function of insulating a wiring from a wiring, an electrode, and the like, arranged with the insulating film therebetween. More specifically, a film that insulates the first wiring from the second wiring, and a film that insulates the second wiring from the pixel electrode, are preferable as the above-mentioned interlayer insulating film.

It is preferable that the first substrate includes a second wiring, the flattening layer is arranged between the first and second wirings, and the flattening layer functions as an interlayer insulating film. According to this, the first wiring can be effectively insulated from the second wiring that is arranged with the flattening layer therebetween, and a parasitic capacitance formed between them can be reduced. As a result, the liquid crystal display panel of the present invention can be driven at high frequency.

It is preferable that the first substrate includes a second wiring and a pixel electrode, the flattening layer is arranged between the second wiring and the pixel electrode, and the flattening layer functions as an interlayer insulating film. According to this, the second wiring can be effectively insulated from the pixel electrode that is arranged with the flattening layer therebetween, and a parasitic capacitance formed between them can be reduced.

It is preferable that the first substrate includes a second wiring and a pixel electrode, the flattening layer includes a first flattening layer and a second flattening layer, each functioning as an interlayer insulating film, the first flattening layer is arranged between the first wiring and the second wiring, the second flattening layer is arranged between the second wiring and the pixel electrode. According to this, the first wiring and the second wiring, and the second wiring and the pixel electrode, are effectively insulated from each other, and further, each parasitic capacitance between them can be reduced. As a result, the liquid crystal display panel of the present invention can be driven at high frequency.

Examples of the material for the flattening layer include SOG materials and organic substances. That is, it is preferable that the flattening layer includes a spin-on glass material. It is also preferable that the flattening layer includes an organic substance.

Resins are preferable as the above-mentioned organic substance. Acrylic resins are particularly preferable. That is, it is preferable that the flattening layer includes a resin, and it is more preferable that the flattening layer includes an acrylic resin.

It is preferable that the second substrate includes a plurality of colored layers, and the column spacer has a structure in which the plurality of colored layers are stacked. If the second substrate includes a multi-layer spacer composed of stacked colored layers, it is difficult to adjust the height of the column spacer. Accordingly, the present invention is applied to such an embodiment, and as a result, the advantages of the present invention can be more effectively exhibited.

The above-mentioned colored layer may be what is so-called a color filter. The above-mentioned colored layer is generally composed of colored layers of a plurality of different colors (three or more colors, preferably).

It is preferable that the second substrate includes an alignment control projection, and the column spacer includes a layer made of the same material as a material for the alignment control projection. If the second substrate includes, as the column spacer, the multi-layer spacer composed of stacked layers made of the same material as that for the alignment control projection, it is difficult to adjust the height of the column spacer. Accordingly, the present invention is applied to such an embodiment, and as a result, the advantages of the present invention can be more effectively exhibited.

The above-mentioned alignment control projection is a projection for controlling alignment of liquid crystals contained in the liquid crystal layer. The alignment control projection may be formed linearly or in a dotted pattern.

It is preferable that the second substrate includes a plurality of colored layers and an alignment control projection, the column spacer has a structure in which a layer made of the same material as a material for the alignment control projection and at least one of the plurality of colored layers are stacked. Thus, if the second substrate includes, as the column spacer, a multi-layer spacer a colored layer and a layer made of the same material as that for the alignment control projection, it is difficult to adjust the height of the column spacer. Accordingly, the present invention is applied to such an embodiment, and as a result, the advantages of the present invention can be more effectively exhibited.

It is preferable that the first substrate includes a pixel electrode, and
the height adjustment layer satisfies the following formula (1):

$$0 \leq z \leq 2 \times (x-y) \qquad (1)$$

If the height adjustment layer satisfies the formula (1), a difference between an actual cell gap and an optimum value, generated when the CF substrate in the conventional liquid crystal display panel not including the flattening layer is used in the liquid crystal display panel in the present embodiment can be reduced.

It is preferable that the first substrate includes a pixel electrode, and
the height adjustment layer substantially satisfies the following formula (2).

$$z = x - y \qquad (2)$$

If the height adjustment layer substantially satisfies the formula (2), a difference between an actual cell gap and an optimum value, generated when the CF substrate in the conventional liquid crystal display panel not including the flattening layer is used in the liquid crystal display panel in the present embodiment, is not substantially generated.

In both of the above-mentioned formulae (1) and (2),
z represents a thickness of the height adjustment layer;
x represents (h1−dp): a difference between h1 and dp,
the h1 represents a height of the first wiring from a surface of the first insulating substrate in a region facing the column spacer,
the dp represents a thickness of the pixel electrode,
y represents (h2−h3−z): a value calculated by subtracting h3 and z from h2,
the h2 represents a height of a top surface from the surface of the first insulating substrate in a region where the height adjustment layer is arranged,
the h3 represents a height of the top surface from the surface of the first insulating substrate in a region facing a pixel opening,
the z represents a thickness of the height adjustment layer.

If the height adjustment layer is composed of a plurality of layers, z in each of the formulae (1) and (2) is a sum of the thickness of the respective layers constituting the height adjustment layer.

The height adjustment layer does not necessarily strictly satisfy the formula (2). That is, the height adjustment layer substantially satisfies the formula (2) to such an extent that the liquid crystal display panel in the present embodiment, including the CF substrate in the conventional liquid crystal display panel not including the flattening layer, exhibits display qualities equal to those exhibited when a difference between an actual cell gap and an optimum value is almost zero.

The present invention is a liquid crystal display device including the liquid crystal display panel of the present invention. According to this, shortening of production time for the liquid crystal display device, simplification of inventory management of the CF substrate, and reduction in production costs of the liquid crystal display device, are permitted.

The present invention is also a television receiver (liquid crystal TV device) including the liquid crystal display device of the present invention. According to this, shortening of production time for the liquid crystal TV device, simplification of inventory management of the CF substrate, and reduction in production costs of the liquid crystal TV device, are permitted.

EFFECT OF THE INVENTION

According to the liquid crystal display panel of the present invention, shortening of production time for the liquid crystal display panel, simplification of inventory management of the CF substrate, and reduction in production costs of the liquid crystal display panel, are permitted.

BEST MODES FOR CARRYING OUT THE INVENTION

The present invention is mentioned in more detail below with reference to Embodiments using drawings, but not limited to only these Embodiments.

Embodiment 1

A liquid crystal display device in accordance with Embodiment 1 is mentioned. FIG. 1 is a plan view schematically showing a configuration of one pixel of a liquid crystal display panel in accordance with Embodiment 1. FIG. 2 is a plan view schematically showing a configuration of one pixel of a TFT substrate in accordance with Embodiment 1. FIG. 3 is a plan view schematically showing a configuration of one pixel of a CF substrate in accordance with Embodiment 1. FIG. 4 is a cross-sectional view schematically showing the panel taken along line X1-X2 in FIG. 1 and it shows a configuration near a region where a column spacer is arranged in the liquid crystal display panel in accordance with Embodiment 1. FIG. 5 is a cross-sectional view schematically showing the panel taken along line Y1-Y2 in FIG. 2 and it shows a configuration near a region where a TFT is arranged in the TFT substrate in accordance with Embodiment 1.

A liquid crystal display panel 100a in accordance with Embodiment 1 includes: an active matrix substrate (hereinafter; also referred to as a "TFT substrate") 30a; a counter substrate (hereinafter, also referred to as a "CF substrate") 10a facing the TFT substrate 30a; and a liquid crystal layer 20 arranged between these substrates. The liquid crystal display panel 100a includes a pair of polarizers (not shown) that are arranged on the outer side of the TFT substrate 30a and the CF substrate 10a, respectively, in such a way that directions of polarization axes of these polarizers are in Cross-Nicol relationship.

The liquid crystal layer 20 includes nematic liquid crystal materials with negative dielectric anisotropy.

The CF substrate 10a includes: a transparent insulating substrate (for example, a glass substrate) 11; a black matrix (BM) layer 12; a plurality of colored layers (color filter) 13; a plurality of alignment control projections 15; a counter electrode (common electrode) 16; a plurality of column spacers 17a; and a vertical alignment film (not shown) that is arranged to cover these components.

The TFT substrate 30a includes: a transparent insulating substrate (for example, a glass substrate) 31; a plurality of gate lines 32; a plurality of storage capacitor wirings 33; a flattening layer 34a; a gate insulating film 35; a plurality of semiconductor active layers 36; a plurality of impurity-added semiconductor layers 37; a plurality of source lines 38; a source electrode 39; a drain electrode 40; a passivation film (Pas film) 41; a plurality of pixel electrodes 42; a plurality of height adjustment layers 43a; and a vertical alignment film (not shown) that is arranged to cover these components.

In the TFT substrate 30a, one pixel (sub-pixel) 60 includes two TFTs 44 each including the gate line 32, the gate insulating film 35, the semiconductor active layer 36, the impurity-added semiconductor layer 37, the source electrode 39, and the drain electrode 40. Further, each pixel 60 in the TFT substrate 30a includes two pixel electrodes 42 that can be electrically connected to the two TFTs 44, respectively. Each pixel 60 is composed of two sub-pixels 61.

Thus, if one pixel is divided into two sub-pixels each driven by different TFTs, a pixel defect can be less observed even if generated. That is, if a pixel defect, caused by defects in the TFT, leakage between the pixel electrode and the counter electrode, and the like, is generated, the pixel defect can be less observed because the sub-pixel that is smaller than a normal pixel is a driving pixel. The respective pixels are driven by driving the sub-pixels by different voltages, i.e., by multi-pixel driving, and thereby a variation in gradation depending on a viewing angle can be suppressed. Thus, this structure where sub-pixels are formed in the pixel is a more efficient structure because display characteristics such as a viewing angle, a transmittance, a response speed, and a contrast ratio, can be well-balanced.

The pixel 60 is mentioned as one example of pixels that can be driven by Cs multi-pixel driving. According to the Cs multi-pixel driving, multi-pixel driving is achieved in the following manner. A TFT in a target pixel is selected by being turned on. Then, the TFT is turned off, and during this non-selection period, a voltage applied to the storage capacitor wiring is varied, thereby varying an electric potential of each sub-pixel electrode.

Configurations of the CF substrate 10a and the TFT substrate 30a are mentioned below.

The BM layer 12 is a light-shielding member for shielding a region between the pixels, and it is formed in a lattice pattern in the insulating substrate 11 to face the gate line 32 and the source line 38.

The color filter 13 is composed of color filters of red (R), green (G), and blue (B), and it is formed in a region partitioned by the BM layer 12 in the insulating substrate 11. Only the red color filter 14R is shown in FIG. 4, but in practice, color filters of R, G, and B are arrayed in a stripe pattern.

The alignment control projection 15 is formed into a V shape on the color filter 13. The alignment control projection 15 is arranged in an oblique direction (about 45°, preferably) with respect to stretching directions (up-down and right-left directions when the panel is viewed in plane).

The counter electrode 16 covers the BM layer 12 and the color filter 13 to be arranged over substantially the entire display region.

A column spacer 17a is arranged to face the gate line 32, and it is positioned above the SM layer 12 with the counter electrode 16 therebetween. The column spacer 17a is made of a photoresist for spacers. The column spacer 17*a* may be arranged in each pixel, or may be arranged in every few pixels.

The gate line 32 and the storage capacitor wiring 33 are formed to be substantially parallel to each other in the insulating substrate 31. The gate line 32 and the storage capacitor wiring 33 are formed by patterning one and the same conductive film (for example, a metal thin film). Thus, the gate line 32 and the storage capacitor wiring 33 function as a light-shielding member. The gate line 32 and the storage capacitor wiring 33 each have a thickness of 400 nm, preferably. The storage capacitor wiring 33 forms a storage capacitance with the pixel electrode 42, and with the gate insulating film 35 and the Pas film 41 arranged between the storage capacitor wiring 33 and the pixel electrode 42.

The flattening layer 34*a* and the gate insulating film 35 cover the gate line 32 to be arranged over substantially the entire display region.

The gate insulating film 35 is made of an inorganic insulating material such as silicon nitride (SiNx) and silicon oxide (SiOx) by CVD. The gate insulating film 35 preferably has a thickness of 410 nm.

The flattening layer 34*a* is a film having a flattening function. It is preferable that spin-on glass (SOG) materials are used as a material for the flattening layer 34*a*. Particularly, a SOG material having a Si—O—C bond as a main chain, a SOG material having a Si—C bond as a main chain, and the like, can be preferably used. At the pixel opening, the flattening layer preferably has a thickness of 1500 nm.

The SOG materials can form a glass film (silica film), for example, by being spin-coated. The SOG materials have a low dielectric constant and can easily give a thick film. So if the SOG materials are used as a material for the flattening layer 34*a*, a flattening layer having a low dielectric constant and a large thickness can be easily formed as the flattening layer 34*a*. As a result, a parasitic capacitance formed at an intersection between the gate line 32 and the source line 38 can be effectively reduced.

The gate insulating film 35, the semiconductor active layer 36, the impurity-added semiconductor layer 37, and the Pas film 41 are each made of an inorganic substance by CVD. So these layers generally have no flattening function. That is, the gate insulating film 35, the semiconductor active layer 36, the impurity-added semiconductor layer 37, and the Pas film 41 have substantially uniform thickness between the pixel opening and the region where the gate line 32 is arranged.

As mentioned below, the pixel electrode 42 has no flattening function either because it is made of a transparent conductive film by sputtering.

The vertical alignment films are made of a resin such as polyimide, the films being each arranged in the TFT substrate 30 and the CF substrate 10*a* in such a way that the films are in contact with the liquid crystal layer. The vertical alignment films hardly exhibit a flattening function because they generally have a thickness much smaller than that of the flattening layer 34*a* and the like.

The semiconductor active layer 36 is formed in an island pattern to overlap with the gate line 32 with the flattening layer 34*a* and the gate insulating film 35 therebetween. The semiconductor active layer 36 preferably has a thickness of 100 nm.

The impurity-added semiconductor layer 37 is composed of two regions that are arranged to face each other on the semiconductor active layer 36. The impurity-added semiconductor layer 37 functions as a contact layer for connecting the semiconductor active layer 36 to the source electrode 39 and the drain electrode 40.

The semiconductor active layer 36 is made of amorphous silicon (a-Si) by CVD. The impurity-added semiconductor layer 37 is made of n$^+$ amorphous silicon (n$^+$ a-Si) into which impurities such as phosphorus (P) have been added to silicon (Si).

The source line 38 is arranged to cross with (substantially perpendicular to) the gate line 32 with the flattening layer 34*a* and the gate insulating film 35 therebetween. Thus, the source line 38 and the gate line 32 are arranged with the flattening layer 34*a* therebetween, the flattening layer 34*a* functioning as an interlayer insulating film. So a parasitic capacitance generated between the source line 38 and the gate line 32 can be effectively reduced. Accordingly, the liquid crystal display panel 100*a* can be driven at high frequency.

The source electrode 39 and the drain electrode 40 are arranged to face each other above the semiconductor active layer 36. Further, the source electrode 39 and the drain electrode 40 can be electrically connected to the semiconductor active layer 36 through the impurity-added semiconductor layer 37. The source electrode 39, the drain electrode 40, and the source line 38 are formed by patterning one and the same conductive film (e.g., a metal thin film).

Thus, the TFT 44 is a bottom-gate (inverted staggered) amorphous silicon TFT.

The source electrode 39 is integrated with the source line 38, and so they are electrically connected to each other.

The drain electrode 40 and the pixel electrode 42 are electrically connected to each other through a contact hole 45 formed in the Pas film 41. The source electrode 39, the drain electrode 40, and the source line 38 are formed by patterning one and the same conductive film (e.g., a metal thin film). Thus, the source electrode 39, the drain electrode 40, and the source line 38 function also as a light-shielding member. The source electrode 39, the drain electrode 40, and the source line 38 each preferably have a thickness of 230 nm.

The Pas film 41 covers the TFT 44, the source line 38, the drain electrode 40, and the like, to function as an insulating layer and a passivation layer. The Pas film 41 is made of an inorganic insulating material such as SiNx and SiOx by CVD. The Pas film 41 preferably has a thickness of 265 nm.

The pixel electrode 42 is arranged on the Pas film 41 to face an opening of the sub-pixel 61. The pixel electrode 42 is a transparent conductive film made of ITO (indium tin oxide) and the like by sputtering. The pixel electrode 42 preferably has a thickness of 70 nm. The pixel electrode 42 is provided with a V-shaped alignment control slit 46.

The alignment control slit 46 is arranged in an oblique direction (about 45°, preferably) with respect to an edge of the pixel electrode 42, i.e., the gate line 32 and the source line 38. The alignment control slit 46 is formed to be substantially parallel to the alignment control projection 15. The respective regions of the pixel electrode 42 are electrically connected to each other through a connection part where no alignment control slit 46 is arranged (not shown).

This alignment control slit 46 and the above-mentioned alignment control projection 15 control alignment of liquid crystal molecules contained in the liquid crystal layer 20. The liquid crystal display panel 100*a* includes multi-domain pixels. Thus, the liquid crystal display panel 100*a* displays images in normally black MVA (multi-domain vertical alignment) mode.

The height adjustment layer 43*a* is formed to face the column spacer 17*a*. More specifically, the height adjustment layer 43*a* is arranged between the gate insulating film 35 and the Pas film 41 and selectively arranged in a region facing the column spacer 17*a*. Further, the height adjustment layer 43*a* is formed by patterning the same material as a material for the semiconductor active layer 36. Accordingly, the height z of the height adjustment layer 43a and the thickness (0.10 to 0.15 µm) of the semiconductor active layer 36 are substantially the same. The height adjustment layer 43a generally has a uniform thickness.

The semiconductor active layer 36 is generally formed in an island pattern together with the impurity-added semiconductor layer 37 as follows: a SiNx film that is to be the gate insulating film 35, an amorphous silicon (a-Si) film, and an $n^+$ amorphous silicon ($n^+$ a-Si film) are continuously stacked, and the a-Si film and the $n^+$ a-Si film are patterned. Accordingly, the $n^+$ a-Si film is formed also on the a-Si film that is to be the height adjustment layer 43a. In a channel etch process for the TFT 44, which is performed later, apart where the source electrode 39 and the drain electrode are not overlapped with each other, of the $n^+$ a-Si film, is removed by dry etching. As a result, only the a-Si film, which is made of the same material as that for the semiconductor active layer 36, can be arranged as the height adjustment layer 43a.

The planar shape of the height adjustment layer 43a is not especially limited to a circular shape, and it may be an elliptical shape, a square shape and the like.

The height adjustment layer 43a and the column spacer 17a do not necessarily perfectly face each other when the liquid crystal display panel 100a is viewed in plane, for example, in view of misalignment between the TFT substrate 30a and the CF substrate 10a as long as the height adjustment layer 43a can function as a base for supporting the column spacer 17a.

It is preferable that the height adjustment layer 43a has an area equivalent to or larger than an area of contact between the column spacer 17a and the TFT substrate 30a in order that the height adjustment layer 43a sufficiently functions as a base for supporting the column spacer 17a.

It is preferable that the height adjustment layer 43a is insulated from an electrode, a wiring, and the like. That is, it is preferable that the height adjustment layer 43a is electrically isolated. If the height adjustment layer 43a, which can exhibit conductivity, is electrically connected to a wiring and the like, a parasitic capacitance might be increased or a short circuit might be generated. From such a viewpoint, the height adjustment layer 43a is formed into an island shape.

Thus, the liquid crystal display panel 100a in accordance with the present Embodiment includes a height adjustment layer 43a that is arranged to face the column spacer 17a. Accordingly, in the liquid crystal display panel 100a including the flattening layer 34a of the present Embodiment, a surface-level difference X attributed to the gate line 32 increases by the thickness z of the height adjustment layer 43a although the surface-level difference (y2 in FIG. 12) attributed to the gate line 132 in the conventional liquid crystal display panel 200b including the flattening layer is smaller than the surface-level difference (x1 in FIG. 11) attributed to the gate line 132 in the conventional liquid crystal display panel 200a not including the flattening layer (x1>y2). Accordingly, a CF substrate that is used in the conventional liquid crystal display panel 200a not including the flattening layer can be used in the liquid crystal display panel 100a of the present Embodiment, and so conditions for forming the column spacers do not need to be switched and the inventory management of the CF substrate does not become complicated. As a result, shortening of production time of the liquid crystal display panel, simplification of the inventory management of the CF substrate, and reduction in production costs are permitted.

The height adjustment layer 43a can be formed without complicating the production processes because it is formed by patterning the same material as that for the semiconductor active layer 36.

It is preferable that the thickness z of the height adjustment layer 43a is less than twice as large as a difference between the surface-level difference y2 and the surface-level difference x1, the surface-level difference y2 being attributed to the gate line 132 in the conventional liquid crystal display panel 200b including the flattening layer, the difference x1 being attributed to the gate line 132 in the conventional liquid crystal display panel 200a not including the flattening layer. As a result, a difference between an actual cell gap and its optimum value in the case that the CF substrate of the conventional liquid crystal display panel 200a not including the flattening layer is used in the liquid crystal display panel 100a in the present Embodiment can be smaller than that in the case that the CF substrate of the conventional liquid crystal display panel 200a not including the flattening layer is used in the conventional liquid crystal display panel 200b not including the height adjustment layer.

It is more preferable that the thickness z of the height adjustment layer 43a is adjusted so that x1 is substantially a sum of y2 and z. As a result, a difference between an actual cell gap and its optimum value in the case that the CF substrate of the conventional liquid crystal display panel 200a not including the flattening layer is used in the liquid crystal display panel 100a of the present Embodiment can be almost zero.

A preferable thickness of the height adjustment layer 43a is mentioned below in more detail with reference to FIG. 4. For a brief explanation, the gate line 32 in the liquid crystal display panel 100a of the present Embodiment including the flattening layer and the gate bus line 132 in the conventional liquid crystal display panel 200a not including the flattening layer are defined to have the same thickness.

It is preferable that the thickness of the height adjustment layer 43a is adjusted so that the following formula (3) is satisfied.

$$h1-dp=h2-h3 \tag{3}$$

In the formula, the h1 represents a height of the gate line 32 from the first insulating substrate surface in a region facing the column spacer 17a (thickness of the gate line 32), the h2 represents a height of the top surface of layers that are stacked on the insulating substrate 31 from the insulating substrate 31 surface in a region where the height adjustment layer 43a is arranged (a height of the top surface of layers including the height adjustment layer 43a from the insulating substrate 31 surface in the region facing the column spacer 17a), the h3 represents a height of the top surface of layers that are stacked on the insulating substrate 31 from the insulating substrate 31 surface in a region facing a pixel opening (a height of the top surface of layers stacked on the insulating substrate 31 from the insulating substrate 31 surface in a region facing a pixel opening), and the dp represents a thickness of the pixel electrode 42.

As a result, the difference between the actual cell gap and its optimum value in the case that the CF substrate of the conventional liquid crystal display panel 200a not including the flattening layer is used in the liquid crystal display panel 100a of the present Embodiment can be almost zero.

The above formula (3) can be modified into the above formula (2) when the thickness of the height adjustment layer 43a is defined as 2, the (h1−dp) as x, and the (h2−h3−z) as y.

Thus, the thickness z of the height adjustment layer 43a may be adjusted so that the above-mentioned formula (2) is satisfied. Also in such an embodiment, the difference between the actual cell gap and its optimum value can be almost zero.

In addition, x (=h1−dp) is also a difference between the height of the top surface of the layers stacked on the insulating substrate 31 from the insulating substrate 31 surface in a region facing the column spacer 17a and the height h3 of the top surface from the insulating substrate 31 surface in a region facing the pixel opening in the case that the flattening layer 34a has no flattening function and the height adjustment layer 43a is not formed. That is, x could correspond to a surface-level difference x1 attributed to the gate line 132 in the conventional liquid crystal display panel 200a not including the flattening layer as shown in FIG. 11.

Further, y is also a difference between the height of the top surface of the layers stacked on the insulating substrate 31 from the insulating substrate 31 surface in the region overlapping with the gate line 32 and not overlapping with the height adjustment layer 43a and the height of the top surface of the layers stacked on the insulating substrate 31 from the insulating substrate 31 surface, and the height of the top surface of the layers stacked on the insulating substrate 31 from the insulating substrate 31 surface in the region facing the pixel opening. That is, y could correspond to the surface-level difference y2 attributed to the gate line 132 in the conventional liquid crystal display panel 200b including the flattening layer as shown in FIG. 12.

The thickness of the height adjustment layer 43a may be adjusted so that the above formula (1) is satisfied. In such a case, the difference between the actual cell gap and its optimum value can be reduced compared to the case that the height adjustment layer 43a is not arranged.

However, it is not preferable that z is not smaller than 2×(x−y) because the difference between the actual cell gap and its optimum value is increased compared to the case where the height adjustment layer 43a is not arranged.

If the gate line 32 in the liquid crystal display panel 100a of the present Embodiment including the flattening layer and the gate line 132 in the conventional liquid crystal display panel 200a not including the flattening layer have different thicknesses, values of x and z are calculated so that the above formula (2) and/or formula (3) where the thickness of the gate line 132 in the conventional liquid crystal display panel 200a not including the flattening layer is assigned to h1 are/is satisfied. The present invention also can be applied to such a case basically, and also in such a case, the original problems can be solved.

If the height adjustment layer is composed of a plurality of layers, as mentioned in the following Embodiments 3, 5, and 6, a total thickness of the plurality of layers is assigned to z in the above formulae (1) and (2).

If the liquid crystal display device that includes the liquid crystal display panel 100a is prepared, the liquid crystal display panel 100a is connected to a driver, a printed wiring board, a display control circuit, a backlight, and the like through common module assembly steps.

If the thus-prepared liquid crystal display device is used as a TV device, a Y/C separation circuit, a video chroma circuit, an A/D converter, a liquid crystal controller, a backlight driving circuit, a microcomputer, a gradation circuits, etc., are connected to this liquid crystal display device in a common way.

The MVA liquid crystal display panel is mentioned in the present Embodiment, but the display mode of the liquid crystal display panel in the present Embodiment is not especially limited. The liquid crystal display panel may be in TN, STN, IPS modes, and the like.

One pixel is divided into two (the number of sub-pixels in one pixel is two) in the liquid crystal display panel 100a. However, the number of sub-pixels in one pixel is not especially limited and it may be two or more. The pixel may not be necessarily divided in the liquid crystal display panel in the present Embodiment.

Embodiment 2

A liquid crystal display device in accordance with Embodiment 2 is mentioned. Contents that overlap between the present Embodiment and Embodiment 1 are omitted and are not shown in drawings. FIG. 6 is a cross-sectional view schematically showing a configuration near a region where a column spacer is arranged in the liquid crystal display panel in accordance with Embodiment 2.

A liquid crystal display panel 100b in accordance with Embodiment 2 includes a TFT substrate 30b and a CF substrate 10b.

The CF substrate 10b includes a multi-layer spacer as a column spacer 17b. Specifically, a red color filter 14R is stacked also on a BM layer 12, and further a green color filter 14G and a blue color filter 14B are stacked on the red color filter 14R to be positioned above (in FIG. 6, below) the BM layer 12. Further, a layer (resin layer) 18 that is made of the same material as that for an alignment control projection is arranged to cover the green color filter 19G and the blue color filter 14B. The column spacer 17b has a structure in which color filters 14R, 14G, and 14B of different colors and the resin layer 18 are stacked.

The TFT substrate 30 b includes a height adjustment layer 43b that is arranged to face the column spacer 17b. More specifically, the height adjustment layer 43b is arranged in a layer between a gate insulating film 35 and a Pas film 41, and it is formed by patterning the same material (conductive film) as that for the source line (not shown). So the height adjustment layer 43b and the source line have substantially the same thickness (the thickness of the source line is about 0.20 to 0.26 μm).

It is preferable that the height adjustment layer 43b is insulated from an electrode, a wiring, and the like. If the height adjustment layer 43a is electrically connected to a wiring and the like, a parasitic capacitance might be increased or a short circuit might be generated.

According to this, a CF substrate that is used in the conventional liquid crystal display panel 200c not including the flattening layer can be used in the liquid crystal display panel 100b of the present Embodiment because the panel 100b includes the height adjustment layer 43b that is arranged to face the column spacer 17b, similarly to Embodiment 1. So conditions for forming the column spacers do not need to be switched and further, the inventory management of the CF substrate does not become complicated. As a result, shortening of production time of the liquid crystal display panel of the present invention, simplification of the inventory management of the CF substrate, and reduction in production costs are permitted.

The height adjustment layer 43b can be formed without complicating the production processes because it is formed by patterning the same material as that for the source line.

It is difficult to adjust the height of the multi-layer spacer as mentioned above. That is, if the color filter thickness is varied, for example, a display color and a transmittance are changed. If the thickness of the resin for forming the alignment control projection is varied, the height and width of the alignment control projection varies, and as a result, a response speed, a transmittance, and the like are influenced. Accordingly, it is more preferable to apply the present invention to the liquid crystal display panel including the multi-layer spacer.

Embodiment 3

A liquid crystal display device in accordance with Embodiment 3 is mentioned below. Contents that overlap between the present Embodiment, and Embodiments 1 and 2 are omitted and are not shown in drawings. FIG. 7 is a cross-sectional view schematically showing a configuration near a region where the column spacer is arranged in the liquid crystal display panel in accordance with Embodiment 3.

A liquid crystal display panel 100c in accordance with Embodiment 3 includes a TFT substrate 30c and the same CF substrate 10b including a multi-layer spacer as the column spacer 17b, as in Embodiment 2.

The TFT substrate 30c includes height adjustment layers 43c and 43d that are arranged to face the column spacer 17b. More specifically, the height adjustment layer 43c is arranged in a layer between a gate insulating film 35 and a Pas film 41 and it is formed by patterning the same material as that for a semiconductor active layer (not shown). The height adjustment layer 43d is arranged on the Pas film 41 and it is formed by patterning the same material (transparent conductive film) as that for a pixel electrode 42. Accordingly, the height adjustment layer 43c and the semiconductor active layer have substantially the same thickness (the semiconductor active layer has a thickness of 0.10 to 0.15 μm). The height adjustment layer 43d and the pixel electrode have substantially the same thickness (the pixel electrode has a thickness of 0.06 to 0.08 μm).

The liquid crystal display panel 100c in the present Embodiment includes the height adjustment layers 43c and 43d that are arranged to face the column spacer 17b. Similarly to Embodiment 1, the CF substrate that is used in the conventional liquid crystal display panel 200c not including the flattening layer can be used in the liquid crystal display panel 100c of the present Embodiment, and so conditions for forming the column spacers do not need to be switched and further, the inventory management of the CF substrate does not become complicated. As a result, shortening of production time of the liquid crystal display panel, simplification of the inventory management of the CF substrate, and reduction in production costs are permitted.

The height adjustment layers 93c and 43d are can be formed without complicating the production processes because they are formed by patterning the same material as that for the semiconductor active layer and the pixel electrode 42.

The liquid crystal display panel 100c includes the height adjustment layers 93c and 43d that are different in thickness. So the height of the top surface of layers including the height adjustment layers 43c and 43d from the insulating substrate 31 surface in the region facing the column spacer 17b can be minutely adjusted.

The height adjustment layers 43c and 43d do not necessarily perfectly face each other when the liquid crystal display panel 100c is viewed in plane as long as the height adjustment layers 43c and 43d can function as a base for supporting the column spacer 17b.

In addition, the height adjustment layers 43c and 93d do not necessarily perfectly face the column spacer 17b when the liquid crystal display panel 100c is viewed in plane, for example, in view of misalignment between the TFT substrate 30c and the CF substrate 10b as long as the height adjustment layers 43c and 43d can function as a base for supporting the column spacer 17b

Embodiment 4

A liquid crystal display device in accordance with Embodiment 4 is mentioned below. Contents that overlap between the present Embodiment, and Embodiments 1 to 3 are omitted and are not shown in drawings. FIG. 8 is a cross-sectional view schematically showing a configuration near a region where a column spacer is arranged in a liquid crystal display panel in accordance with Embodiment 4.

A liquid crystal display panel 100d in accordance with Embodiment 4 includes a TFT substrate 30d and the same CF substrate 10b including a multi-layer spacer as the spacer 17b, as in Embodiment 2.

The TFT substrate 30d includes a flattening layer 34b formed over substantially the entire display region to cover the Pas film 41, instead of the flattening layer 34a.

Organic substances, particularly, resins are preferably used as a material for the flattening layer 34b. Particularly, acrylic resins are preferably used as a material for the flattening layer 34b. More preferably, a photosensitive resin can be used. The flattening layer 34b at the pixel opening preferably has a thickness of 2600 nm.

Thus, the liquid crystal display panel 100d can be produced at low costs compared with the liquid crystal display panel 100a, because the panel 100d includes the flattening film 34b made of a very versatile resin instead of the flattening film 34a made of a SOG material.

In the liquid crystal display panel 100d, the pixel electrode 42 is connected to a drain electrode (not shown) through a contact hole (not shown) that penetrates the Pas film 41 and the flattening layer 34b.

The TFT substrate 30d includes a height adjustment layer 43e that is arranged to face the column spacer 17b. More specifically, the height adjustment layer 43e is arranged on the Pas film 41 and it is formed by patterning the same material (transparent conductive film) as that for the pixel electrode 42. Accordingly, the height adjustment layer 43e and the pixel electrode have substantially the same thickness (the pixel electrode has a thickness of about 0.06 to 0.08 μm).

The liquid crystal display panel 100d in the present Embodiment includes the height adjustment layer 43e that is arranged to face the column spacer 17b. Similarly to Embodiment 1, the CF substrate that is used in the conventional liquid crystal display panel 200c not including the flattening layer can be used in the liquid crystal display panel 100d in the present Embodiment, and so conditions for forming the column spacers do not need to be switched and further, the inventory management of the CF substrate does not become complicated. As a result, shortening of production time of the liquid crystal display panel, simplification of the inventory management of the CF substrate, and reduction in production costs are permitted.

The height adjustment layer 43e can be formed without complicating the production processes because it is formed by patterning the same material as that for the pixel electrode 42.

The height adjustment layer 43e in the liquid crystal display panel 100d has a small thickness, and so such a panel 100d is preferably used when the flattening layer 34b does not exhibit the flattening function so much.

Embodiment 5

A liquid crystal display device in accordance with Embodiment 5 is mentioned. Contents that overlap between the present Embodiment, and Embodiments 1 to 4 are omitted and are not shown in drawings. FIG. 9 is a cross-sectional view schematically showing a configuration near a region where a column spacer is arranged in a liquid crystal display panel in accordance with Embodiment 5.

A liquid crystal display panel 100e in accordance with Embodiment 5 includes a TFT substrate 30e and the same CF substrate 10b including a multi-layer spacer as the column spacer 17b, as in Embodiment 2.

The TFT substrate 30e includes a flattening layer 34c that covers the Pas film 41 to be arranged over substantially the entire display region, instead of the flattening layer 34a. As a result, a source line and a pixel electrode 42 can be effectively insulated from each other, and so a parasitic capacitance generated therebetween can be reduced.

Organic substances, particularly, resins are preferably used as a material for the flattening layer 34c. Particularly, acrylic resins are preferably used as a material for the flattening layer 34c.

Thus, the liquid crystal display panel 100e can be produced at low costs compared with the liquid crystal display panel 100a, because the panel 100e includes the flattening film 34c made of a very versatile resin, and the like, instead of the flattening film 34a made of a SOG material.

In the liquid crystal display panel 100e, the pixel electrode 42 is connected to a drain electrode (not shown) through a contact hole (not shown) that penetrates the Pas film 41 and the flattening layer 34c.

The TFT substrate 30e includes height adjustment layers 43f and 43g that are arranged to face the column spacer 17b. More specifically, the height adjustment layer 43f is arranged in a layer between the gate insulating film 35 and the Pas film 41, and it is formed by patterning the same material as that for a semiconductor active layer (not shown). The height adjustment layer 43g is arranged on the flattening layer 34c, and it is formed by patterning the same material (transparent conductive film) as that for the pixel electrode 42. Accordingly, the height adjustment layer 43f and the semiconductor active layer have substantially the same thickness (the semiconductor active layer has a thickness of about 0.10 to 0.15 μm). The height adjustment layer 43g and the pixel electrode (having a thickness of 0.06 to 0.08 μm) have substantially the same thickness.

The liquid crystal display panel 100 in the present Embodiment includes the height adjustment layers 43f and 43g that are arranged to face the column spacer 17b. Similarly to Embodiment 1, the CF substrate that is used in the conventional liquid crystal display panel 200c not including the flattening layer can be used in the liquid crystal display panel 100e in the present Embodiment, and so conditions for forming the column spacers do not need to be switched and further, the inventory management of the CF substrate does not become complicated. As a result, shortening of production time, simplification of the inventory management of the CF substrate, and reduction in production costs are permitted.

The height adjustment layers 43f and 43g are formed without complicating the production processes because it is formed by patterning the same material as that for the semiconductor active layer and the pixel electrode 42.

The liquid crystal display panel 100 includes the height adjustment layers 43f and 43g that are different in thickness. The height of the top surface of the layers including the height adjustment layers 43f and 43g from the insulating substrate 31 surface in the region facing the column spacer 17 can be minutely adjusted.

Embodiment 6

A liquid crystal display device in accordance with Embodiment 6 is mentioned. Contents that overlap between the present Embodiment, and Embodiments 1 to 5 are omitted and are not shown in drawings. FIG. 10 is a cross-sectional view schematically showing a configuration near a region where a column spacer is arranged in a liquid crystal display panel in accordance with Embodiment 6.

The liquid crystal display panel 100f in accordance with Embodiment 6 includes a TFT substrate 30f and the same CF substrate 10b including a multi-layer spacer as the column spacer 17b, as in Embodiment 2.

The TFT substrate 30f includes the same flattening layer 34a as in Embodiment 1 and the same flattening layer 34c that covers a Pas film 41 as in Embodiment 5. According to this, the gate line 32 and the source line, the source line and the pixel electrode 42, are effectively insulated from each other, and further, a parasitic capacitance generated therebetween can be reduced.

Thus, the TFT substrate 30f includes the flattening layer composed of two layers. So the flatness of the substrate can be more improved. As a result, in order to use the conventional liquid crystal display panel not including the flattening layer in the present Embodiment, the height adjustment layer needs to have a larger thickness.

The TFT substrate 30f includes the height adjustment layers 43h, 43i, and 43j that face the column spacer 17b. More specifically, the height adjustment layers 43h, 43i, and 43j are arranged in layers between the gate insulating film 35 and the Pas film 41. The height adjustment layer 43h is formed by patterning the same material as in the semiconductor active layer (not shown). The height adjustment layer 43i is formed by patterning the same material as that for an impurity-added semiconductor layer (not shown). The height adjustment layer 43j is formed by patterning the same material (conductive film) as that for a source line (not shown). Accordingly, the height adjustment layer 43h and the semiconductor active layer (having a thickness of 0.10 to 0.15 μm) have substantially the same thickness. The height adjustment semiconductor layer 43i and the impurity-added semiconductor layer (having a thickness of 0.05 to 0.06 μm) have substantially the same thickness. The height adjustment layer 43j and the source line (having a thickness of 0.20 to 0.26 μm) have substantially the same thickness.

The liquid crystal display panel 100f in the present Embodiment includes the TFT substrate 30f having amore flattened surface and includes the height adjustment layers 43h, 43i, and 43j that faces the column spacer 17b. Similarly to Embodiment 1, the CF substrate that is used in the conventional liquid crystal display panel 200c not including the flattening layer can be used in the liquid crystal display panel 100f in the present Embodiment, and so conditions for forming the column spacers do not need to be switched and further, the inventory management of the CF substrate does not become complicated. As a result, shortening of production time, simplification of the inventory management of the CF substrate, and reduction in production costs are permitted.

The height adjustment layers 43h, 43i, and 43j can be formed without complicating production processes because they are formed by patterning the same materials as those for the semiconductor active layer, the impurity-added semiconductor layer, and the source line, respectively.

As mentioned in Embodiments 1 to 6, in the present invention, it is preferable that a material for the height adjustment layer is appropriately selected from materials for components constituting the TFT substrate so that the liquid crystal display panel of the present invention including the CF substrate of the conventional liquid crystal display panel not including the flattening film is provided with a desired cell gap.

The present invention is mentioned in detail with reference to Embodiments 1 to 6, and such Embodiments may be appropriately combined without departing from the spirit and scope of the invention.

The present application claims priority to Patent Application No. 2007-57171 filed in Japan on Mar. 7, 2007 under the Paris Convention and provisions of national law in a designated State, the entire contents of which are hereby incorporated by reference.

Figure 1:
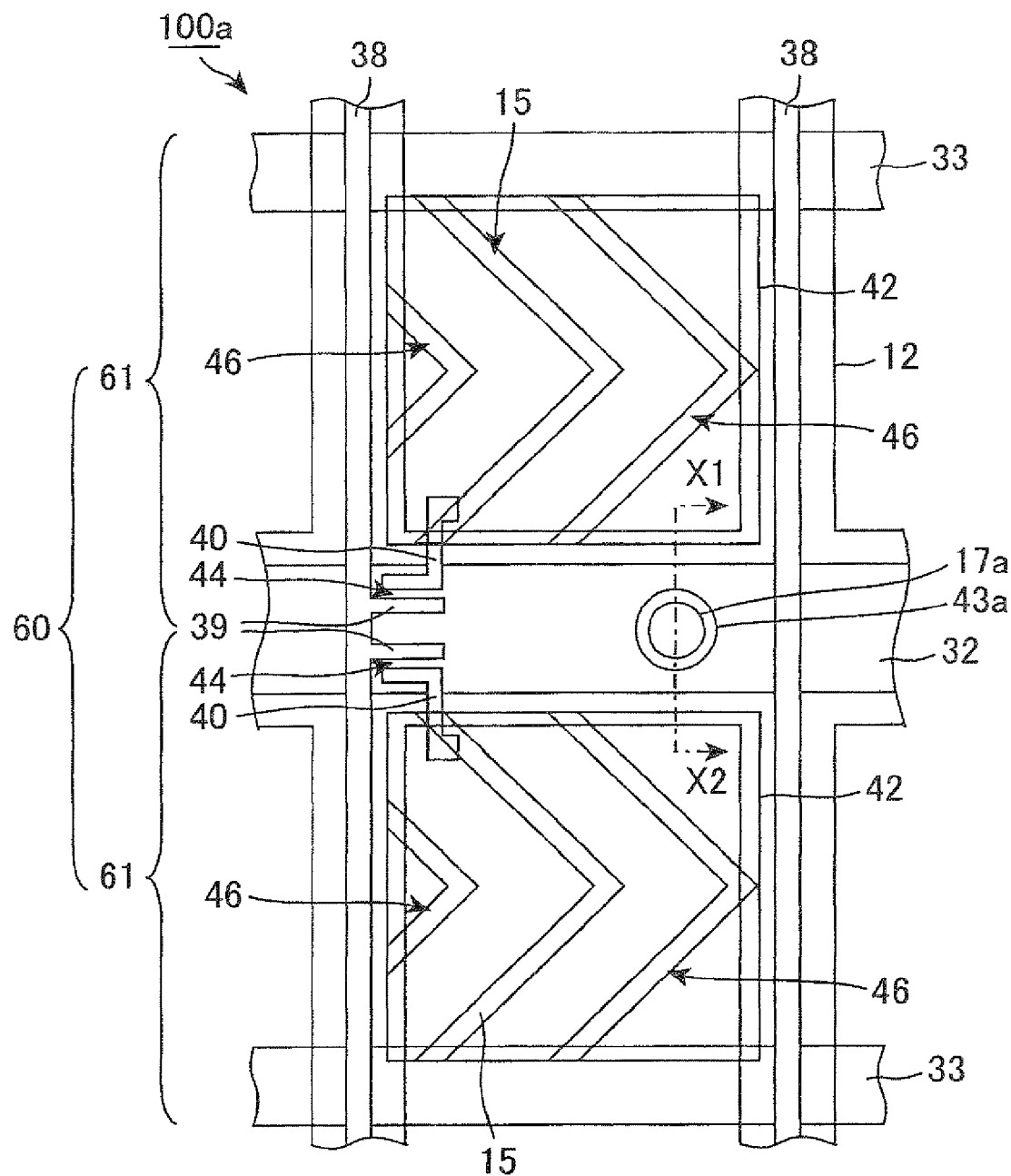
FIG. 1 is a plan view schematically showing a configuration one pixel of the liquid crystal display panel in accordance with Embodiment 1.
Figure 2:
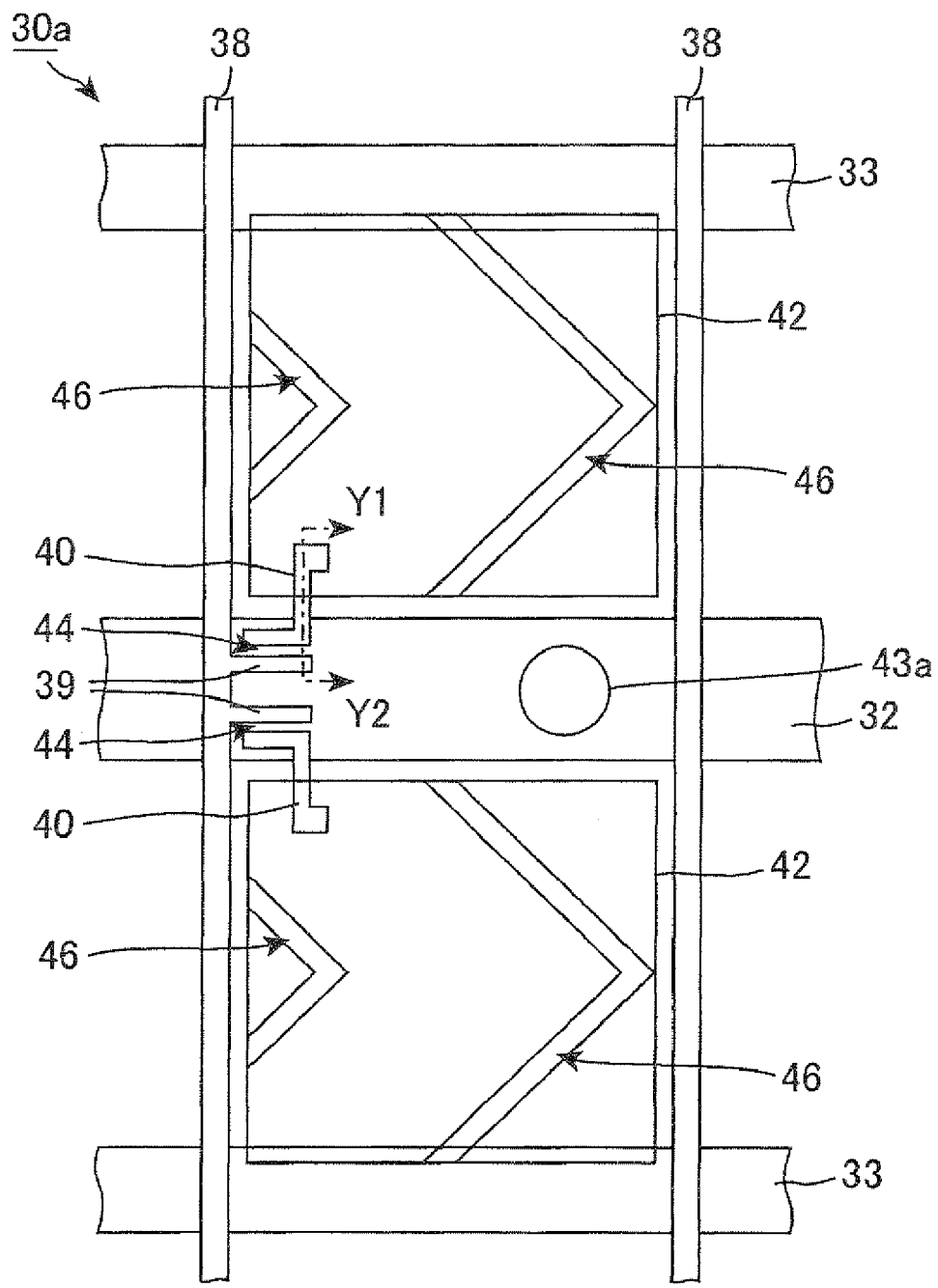
FIG. 2 is a plan view schematically showing a configuration of one pixel of the TFT substrate in accordance with Embodiment 1.
Figure 3:
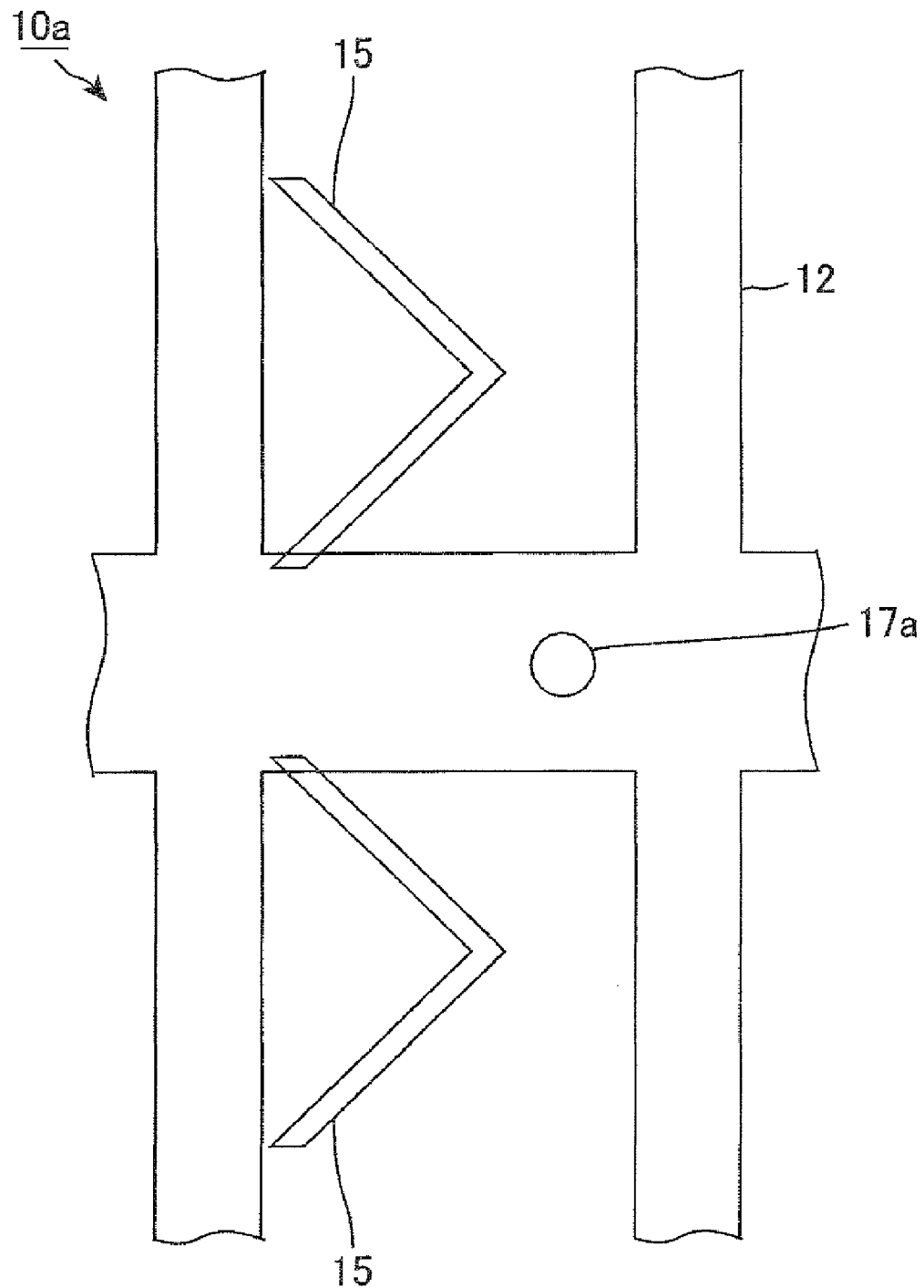
FIG. 3 is a plan view schematically showing a configuration of one pixel of the CF substrate in accordance with Embodiment 1.
Figure 4:
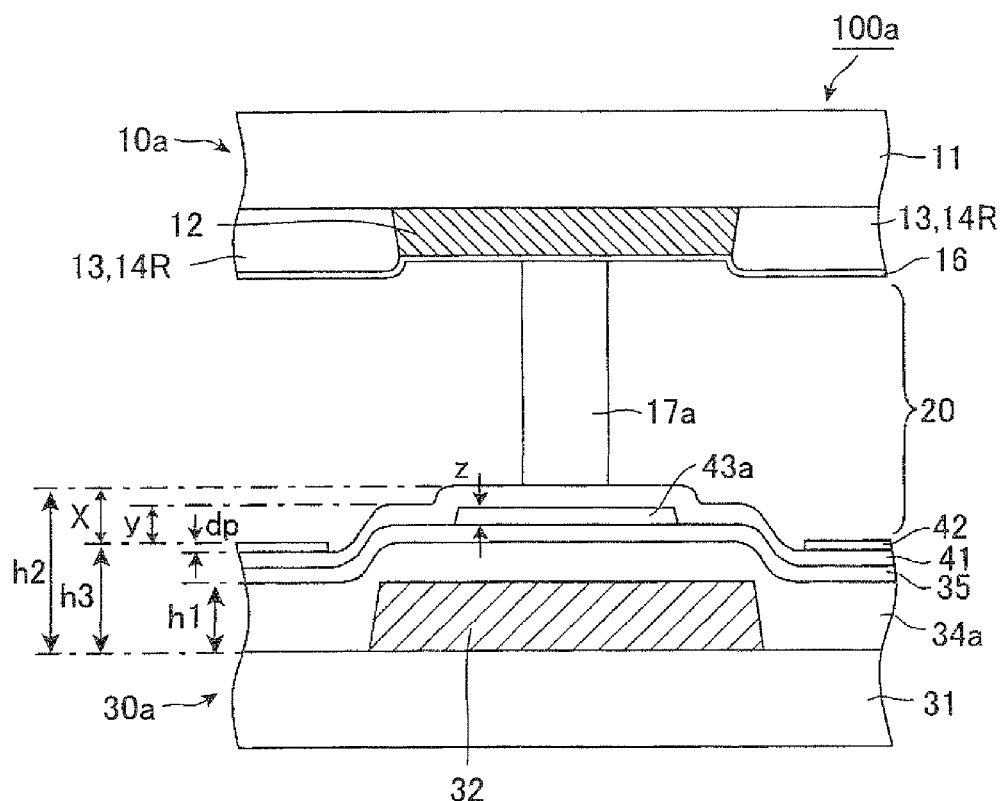
FIG. 4 is a cross-sectional view schematically showing the panel taken along line X1-X2 in FIG. 1 and it shows a configuration near a region where a column spacer is arranged in the liquid crystal display panel in accordance with Embodiment 1.
Figure 5:
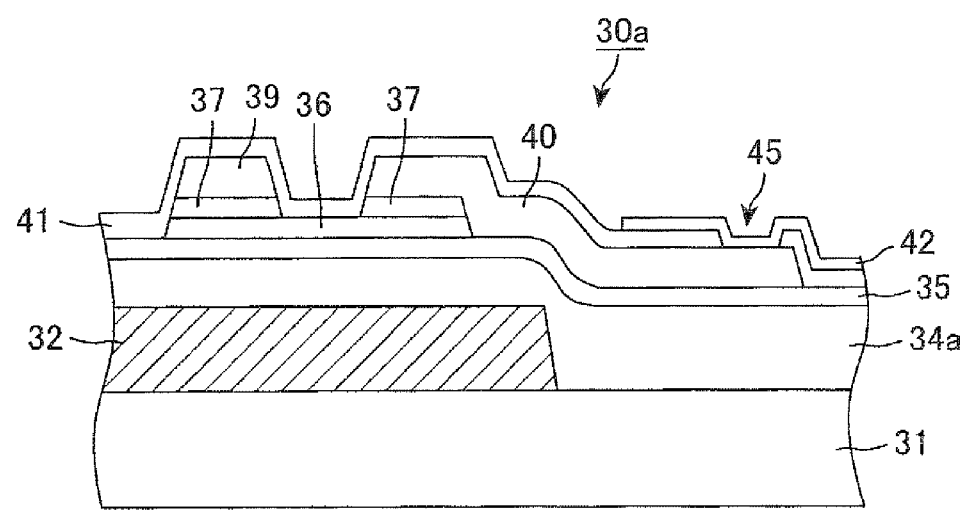
FIG. 5 is a cross-sectional view schematically showing the panel taken along line Y1-Y2 in FIG. 2 and it shows a configuration near a region where a TFT is arranged in the TFT substrate in accordance with Embodiment 1.
Figure 6:
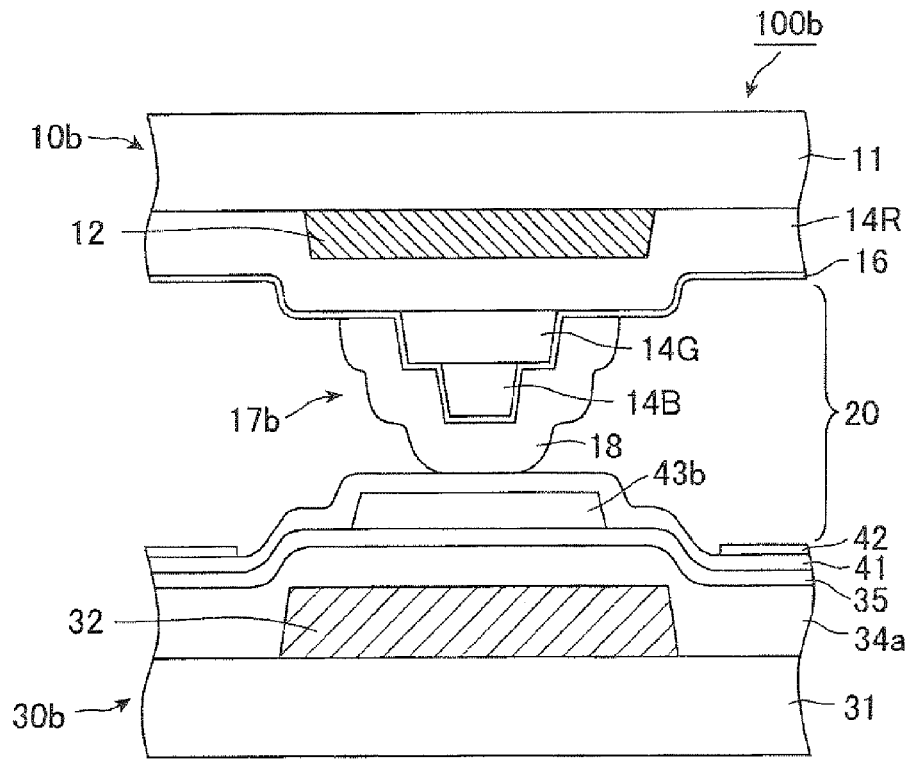
FIG. 6 is a cross-sectional view schematically showing a configuration near a region where a column spacer is arranged in the liquid crystal display panel in accordance with Embodiment 2.
Figure 7:
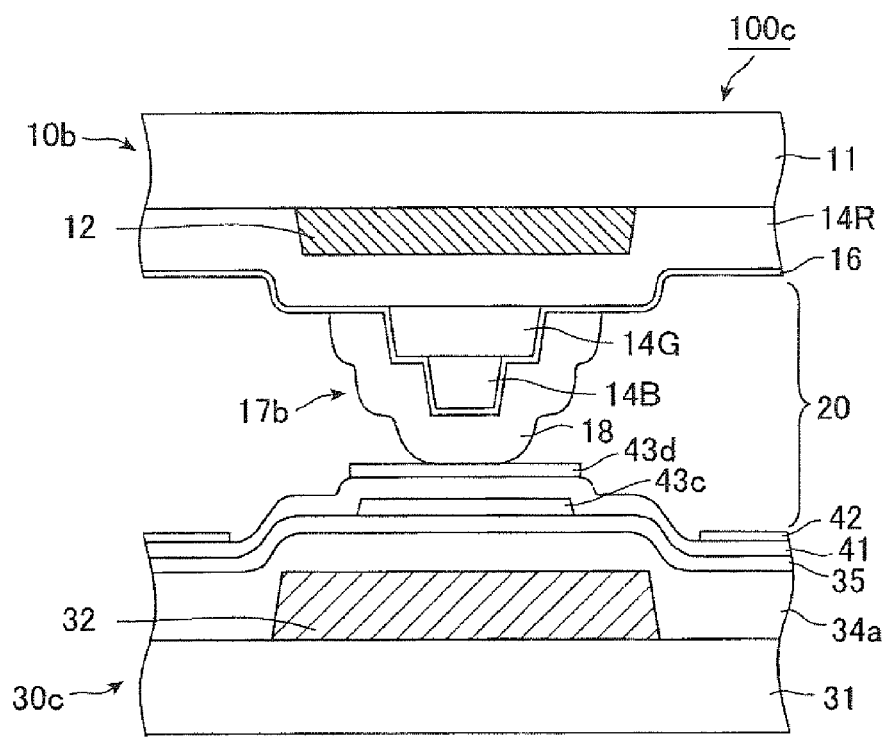
FIG. 7 is a cross-sectional view schematically showing a configuration near a region where a column spacer is arranged in the liquid crystal display panel in accordance with Embodiment 3.
Figure 8:
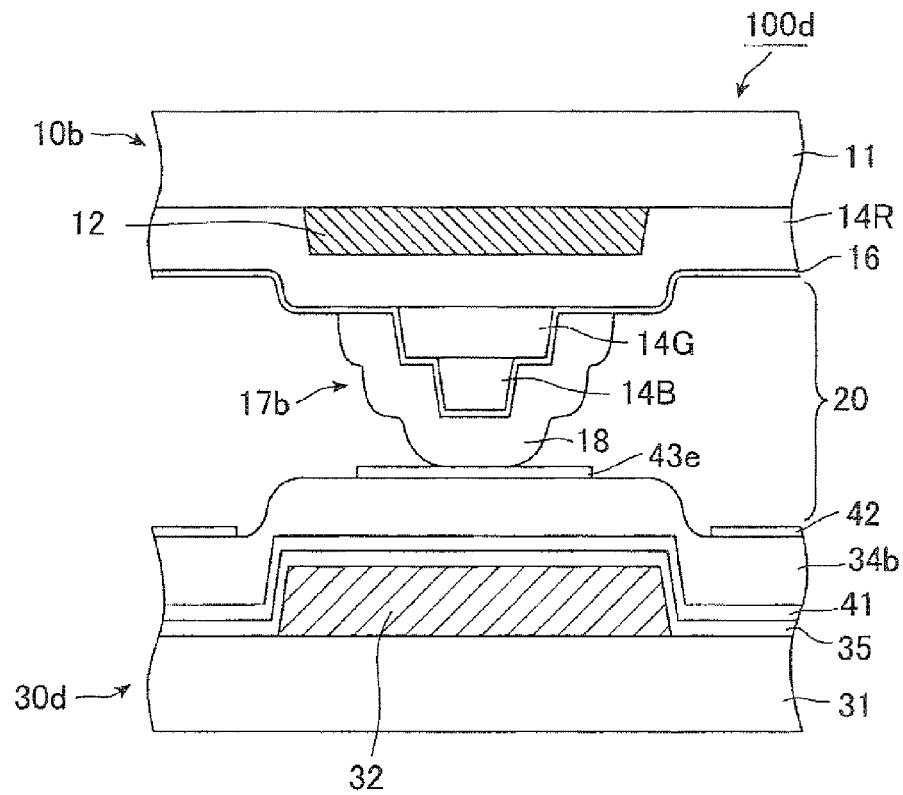
FIG. 8 is a cross-sectional view schematically showing a configuration near a region where a column spacer is arranged in the liquid crystal display panel in accordance with Embodiment 4.
Figure 9:
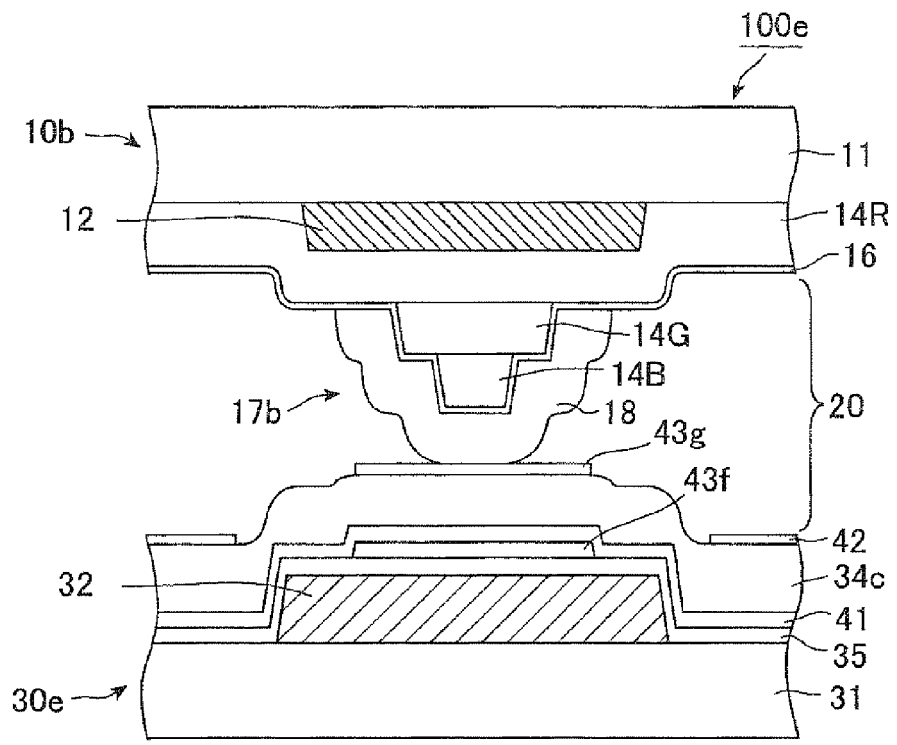
FIG. 9 is a cross-sectional view schematically showing a configuration near a region where a column spacer is arranged in the liquid crystal display panel in accordance with Embodiment 5.
Figure 10:
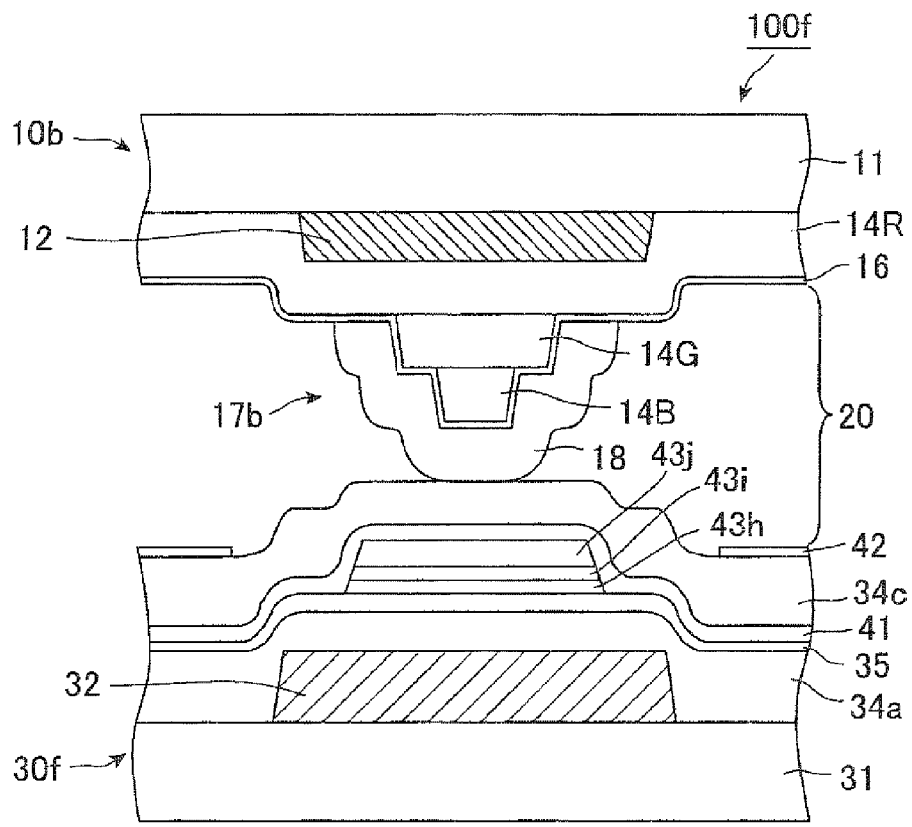
FIG. 10 is a cross-sectional view schematically showing a configuration near a region where a column spacer is arranged in the liquid crystal display panel in accordance with Embodiment 6.
Figure 11:
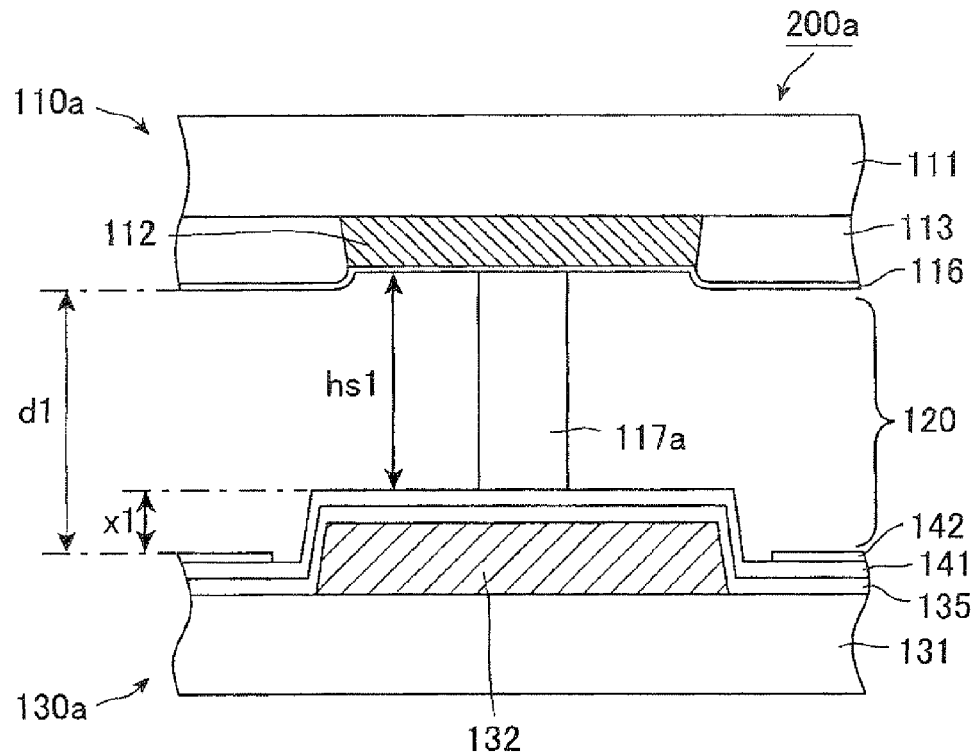
FIG. 11 is a cross-sectional view schematically showing a configuration near a region where a column spacer is arranged in a conventional liquid crystal display panel.
Figure 12:
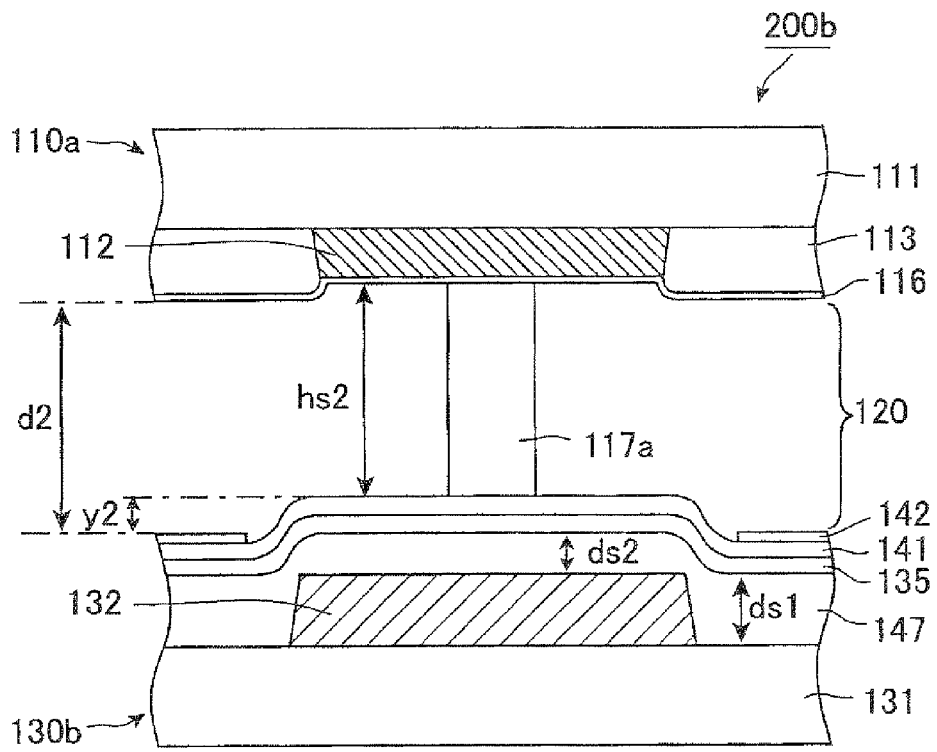
FIG. 12 is a cross-sectional view schematically showing a configuration near a region where a column spacer is arranged in a conventional liquid crystal display panel.
Figure 13:
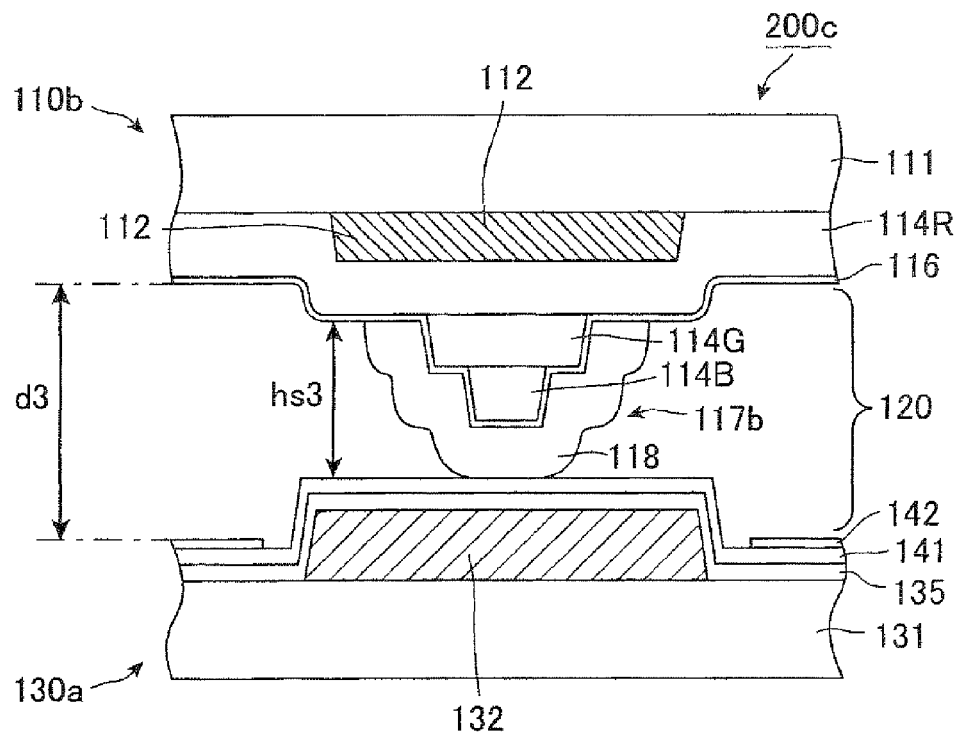
FIG. 13 is a cross-sectional view schematically showing a configuration near a region where a column spacer (multi-layer spacer) is arranged in a conventional liquid crystal display panel.
Figure 14:
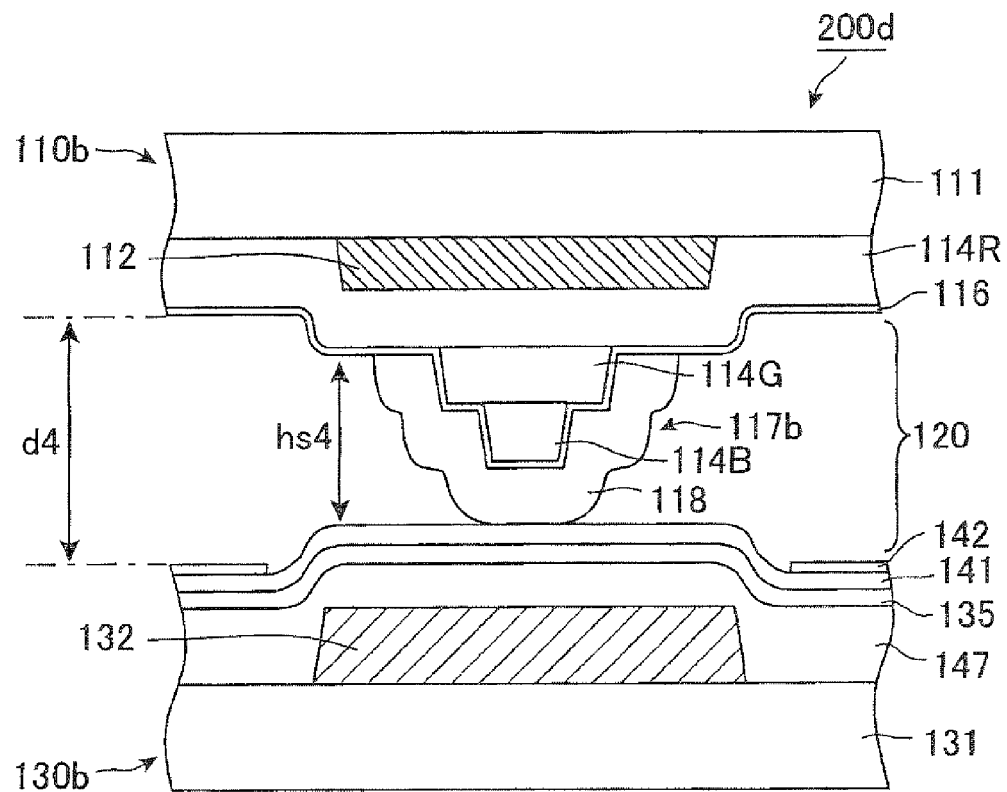
FIG. 14 is a cross-sectional view schematically showing a configuration near a region where a column spacer (multi-layer spacer) is arranged in a conventional liquid crystal display panel.

EXPLANATION OF NUMERALS AND SYMBOLS 10a, 10b, 110a, 110b: CF substrate
11, 111: Insulating substrate
12, 112: BM layer
13, 113: Color filter
14R, 114R: Red color filter (colored layer)
14G, 114G: Green color filter (colored layer)
14B, 114B: Blue color filter (colored layer)
15: Alignment control projection
16, 116: Counter electrode
17a, 17b, 117a, 117b: Column spacer
18, 118: Resin layer
20, 120: Liquid crystal layer
30a, 30b, 30c, 30d, 30e, 30f, 130a, 130b: TFT substrate (active matrix substrate)
31, 131: Insulating substrate
32, 132: Gate line
33: Storage capacitor wiring
34a, 34b, 34c: Flattening layer
35, 135: Gate insulating film
36: Semiconductor active layer
37: Impurity-added semiconductor layer
38: Source line
39: Source electrode
40: Drain electrode
41, 141: Passivation film (Pas film)
42, 142: Pixel electrode
43a, 43b, 43c, 43d, 43e, 43f, 43g, 43h, 43i, 43j: Height adjustment layer
44: TFT
45: Contact Hole
46: Alignment control slit
60: Pixel
61: Sub-pixel
100a, 100b, 100c, 100d, 100e, 100f, 200a, 200b, 200c, 200d: Liquid crystal display panel
147: SOG film
d1, d2, d3, d4: Cell gap
hs1, hs2, hs3, hs4: Height of column spacer
x1, y2: Surface-level difference
ds1, ds2: Thickness of SOG film

The invention claimed is:

1. A liquid crystal display panel comprising:
a first substrate;
a second substrate; and
a liquid crystal layer interposed between the first and second substrates,
the first substrate including a first insulating substrate, a first wiring, and a flattening layer,
the first wiring being formed on a liquid crystal layer side of the first insulating substrate,
the flattening layer being arranged between the liquid crystal layer and the first wiring,
the second substrate including a second insulating substrate and a column spacer,
the column spacer being arranged on a liquid crystal layer side of the second insulating substrate to face a region where the first wiring overlaps with the flattening layer,
wherein the first substrate includes a height adjustment layer,
the height adjustment layer being arranged to face the column spacer, and
wherein the first substrate includes a pixel electrode and the height adjustment layer satisfies the following formula (1):

$$0 < z < 2 \times (x-y) \quad (1)$$

in the formula (1), z representing a thickness of the height adjustment layer, x representing (h1−dp): a difference between h1 and dp, the h1 representing a height of the first wiring from a surface of the first insulating substrate in a region facing the column spacer, the dp representing a thickness of the pixel electrode, y representing (h2−h3−z): a value calculated by subtracting h3 and z from h2, the h2 representing a height of a top surface from the surface of the first insulating substrate in a region where the height adjustment layer is arranged, the h3 representing a height of the top surface from the surface of the first insulating substrate in a region facing a pixel opening, the z representing a thickness of the height adjustment layer.

2. A liquid crystal display panel comprising:

a first substrate;

a second substrate; and a liquid crystal layer interposed between the first and second substrates, the first substrate including a first insulating substrate, a first wiring, and a flattening layer, the first wiring being formed on a liquid crystal layer side of the first insulating substrate, the flattening layer being arranged between the liquid crystal layer and the first wiring, the second substrate including a second insulating substrate and a column spacer, the column spacer being arranged on a liquid crystal layer side of the second insulating substrate to face a region where the first wiring overlaps with the flattening layer, wherein the first substrate includes a height adjustment layer, the height adjustment layer being arranged to face the column spacer, and wherein the first substrate includes a pixel electrode, and the height adjustment layer substantially satisfies the following formula (2):

$$z = x - y \quad (2)$$

in the formula (2), z representing a thickness of the height adjustment layer, x representing (h1−dp): a difference between h1 and dp, the h1 representing a height of the first wiring from a surface of the first insulating substrate, the dp representing a thickness of the pixel electrode, y representing (h2−h3−z): a value calculated by subtracting h3 and z from h2, the h2 representing a height of a top surface from the surface of the first insulating substrate in a region where the height adjustment layer is arranged, the h3 representing a height of the top surface from the surface of the first insulating substrate in a region facing a pixel opening, the z representing a thickness of the height adjustment layer.

* * * * *